United States Patent [19]

Falender et al.

[11] 3,865,897

[45] Feb. 11, 1975

[54] METHOD OF BLENDING POLYOLEFINS AND POLYDIORGANOSILOXANE GUMS AND BLENDS THEREOF

[75] Inventors: James R. Falender, Sanford; Sarah E. Lindsey; John C. Saam, both of Midland, all of Mich.

[73] Assignee: Dow Corning Corporation, Midland, Mich.

[22] Filed: Aug. 3, 1973

[21] Appl. No.: 385,360

[52] U.S. Cl.......... 260/827, 117/128.4, 204/159.13, 260/878 R, 260/897 R, 260/900
[51] Int. Cl...................... C08f 29/12, C08f 35/02
[58] Field of Search..................................... 260/827

[56] References Cited
UNITED STATES PATENTS 2,930,083  3/1960  Votovich et al. .................... 260/827
3,798,185  3/1974  Skiens et al........................ 260/827

Primary Examiner—Wilbert J. Briggs, Sr.
Attorney, Agent, or Firm—Roger H. Borrousch

[57] ABSTRACT

Mechanically mixing 7 to 75 weight percent of a polydiorganosiloxane gum having 1.5 to 17 mol percent vinyl or allyl bearing siloxane units with 25 to 93 weight percent of a low density polyethylene, a high density polyethylene, polymethylpentene, polypropylene or a copolymer of tetrafluorethylene and ethylene at a shear rate greater than 10 sec $^{-1}$ for a period of time suitable to obtain a viscosity within 60 percent of the maximum viscosity obtainable at mixing conditions where the temperature is from 175° to 300°C. for low density polyethylene, from 200° to 320°C. for high density polyethylene, from 225° to 300°C. for polymethylpentene, from 215° to 300°C. for polypropylene and from 275° to 350°C. for the copolymer of tetrafluorethylene and ethylene produces a blend of lower modulus suitable for electrical insulation.

9 Claims, No Drawings

METHOD OF BLENDING POLYOLEFINS AND POLYDIORGANOSILOXANE GUMS AND BLENDS THEREOF

BACKGROUND OF THE INVENTION

1. Field of the Invention

This invention relates to a method of blending polyolefins and polydiorganosiloxane gums and blends thereof.

2. Description of Prior Art

Different polymers, some of which are very similar, have been found to be incompatible and many methods and techniques have been attempted to blend the different polymers because it has been theorized that useful products can be obtained. Indeed many useful results have been achieved by combining different polymers to make new materials. Copolymers, both block and graft, have been used to get new and useful properties. Blending of different polymers has also been used by employing certain techniques to hold the various polymers together in a useful state. Polyolefins and silicones have not been slighted in this respect as the art is acquainted with many methods and techniques for combining such materials.

Lawson in U.S. Pat. No. 2,655,489 teaches that polyethylene and silicone oil in a solvent can be heated at 210°F. to produce a friable gel which is useful in improving the gloss of enamels and lacquers. Safford in U.S. Pat. No. 2,888,419 and Precopio et al. in U.S. Pat. No. 2,888,424 teach that polyethylene, filler and organopolysiloxane, which may be highly viscous masses or gummy elastic solids, can be intimately mixed at temperatures up to 135°C. to provide a more extrudible composition with less nerve and improved aging characteristics. They teach that the filler acts as a blending aid for these two polymers which results in a homogeneous product which is difficult to otherwise obtain. Vostovich et al. in U.S. Pat. No. 2,930,083 teach that improved processing of gelled or crosslinked polyethylene can be obtained by mixing gelled polyethylene and organopolysiloxanes which are highly viscous masses to gummy elastic solids on a mill or Banbury mixer at 220°F. for four minutes.

Gober in U.S. Pat. No. 2,992,201 teach that polyethylene can be given non-sticking and non-blocking characteristics by milling a liquid polymeric silicone oil having alkyl groups and polyethylene at 150°C. for 15 to 20 minutes. The polyethylene mixture is then extruded at a temperature of 310° to 370°F. Hurd et al. in U.S. Pat. No. 3,021,292 teach that a uniform mixture of a hydrocarbon rubber and a vinyl-containing organopolysiloxane gum can be made by milling. The resulting mixture can then be cured to a rubber product by heating at 110° to 160°. Safford in U.S. Pat. No. 3,227,777 teaches vulcanizing ethylene-propylene copolymers with an alkenylpolysiloxane and a bis(aralkyl) peroxide. Safford mills the copolymer of ethylene and propylene with the alkenylpolysiloxane and peroxide and thereafter vulcanizes the resulting mixture at 100°C to 175°C. The properties of good heat resistance, electrical properties are due to the cured state of the ethylene-propylene copolymers.

From the above prior art, one would assume that all the problems of combining silicones and polyolefins had been solved, because silicones of a wide variety of descriptions have been used to achieve certain specified results. However, for all the advantages and useful properties alluded to in the prior art, the problem of combining silicone gum and polyolefins still exists as shown by British Pat. No. 1,294,986 published Nov. 1, 1972, which teaches that silicone gums have an adverse effect on the mixing characteristics. It is with this background that the present invention has found a method which overcomes the mixing difficulties for certain polyolefins in addition to obtaining certain useful properties for the products obtained thereby.

SUMMARY OF THE INVENTION

An object of the present invention is to provide a method for blending certain polyolefins with polydiorganosiloxane gums. This object and others will be apparent from the detailed description of the invention.

This invention relates to mixing certain polyolefins and polydiorganosiloxane gums with shear at a temperature specific for each polyolefin for a period of time suitable to obtain a viscosity within 60 percent of the maximum viscosity obtainable at the mixing conditions. This invention also relates to the compositions obtained from this method which have useful electrical properties for insulation purposes, lower modulus than the polyolefin, greater flexibility at low temperature, improved mar resistance and release properties.

DESCRIPTION OF THE INVENTION

This invention relates to a method of blending a polyolefin and a polydiorganosiloxane gum comprising mechanically mixing a polydiorganosiloxane gum and a polyolefin selected from the group consisting of low density polyethylene, high density polyethylene, polymethylpentene, polypropylene and a copolymer consisting of tetrafluoroethylene repeating units and ethylene repeating units, at a shear rate greater than 10 sec$^{-1}$ for a period of time suitable to obtain a viscosity within 60 percent of the maximum viscosity obtainable at mixing conditions, and at a temperature within a range for each polyolefin of from 175° to 300°C. for low density polyethylene, from 200° to 320°C. for high density polyethylene, from 225° to 300°C. for polymethylpentene, from 215° to 300°C. for polypropylene and from 275° to 350°C. for copolymers of tetrafluoroethylene repeating units and ethylene repeating units, and thereafter recovering a processable stable, homogeneous blend, said polydiorganosiloxane gum being present in an amount of from 7 to 75 weight percent and said polyolefin being present in an amount of from 25 to 93 weight percent wherein the combined weight of the polydiorganosiloxane gum and polyolefin is 100 weight percent, said polydiorganosiloxane gum being a toluene soluble gum having a Williams plasticity greater than 0.020 inch, with a ratio of organic groups per silicon atom of about two wherein the organic groups are selected from methyl, phenyl, vinyl and allyl with from 1.5 to 17 mol percent of the siloxane units having vinyl or allyl groups and no more than 50 percent of the organic groups being phenyl.

The polyolefins suitable for use in this invention are those which are solids at ambient conditions and which are thermoplastic and useful in fabricating materials such as molded articles, extruded articles, films, tubes, sheets, drawn articles and the like. The specific polyolefins include low density polyethylene defined for the purpose of this invention as having a density of 0.91 to 0.94, high density polyethylene defined for the purpose of this invention as having a density of 0.95 to 0.97, polymethylpentene, polypropylene and copolymers of tetrafluoroethylene and ethylene. These polyolefins are well known materials of commerce and can be prepared by well known methods. These polyolefins can contain the conventional additives used in commercial products which are sold under these generic names. Additionally these generic names include those polyolefins which are sold under the generic name but which also contain minor amounts of other copolymerized vinylic monomers. For example, low density polyethylene can contain minor amounts of copolymerized vinylacetate, such as up to 10 weight percent vinylacetate is commonly copolymerized in low density polyethylene which is sold under the generic name of low density polyethylene. Thus, the polyolefins suitable for this invention are those in which the generic name is used and includes additives and minor amounts of other copolymerized vinylic monomers.

The polydiorganosiloxane gums suitable for this invention are those toluene soluble gums having a Williams plasticity greater than 0.020 inch. These gums consist essentially of diorganosiloxane units and thus have a ratio of organic groups per silicon atom of about two. Other siloxane units may be present in minor amounts, for example triorganosiloxane units used for endblocking, small amounts of mono-organosiloxane and $SiO_2$ units which are often found in polydiorganosiloxane gums but are present in amounts small enough so that the gums do not become insoluble. The organic groups of the gums are selected from methyl, phenyl, vinyl and allyl which are present as diorganosiloxane units such as dimethylsiloxane units, methylphenylsiloxane units, diphenylsiloxane units, methylvinylsiloxane units, methylallylsiloxane units and phenylvinylsiloxane units. Any other siloxane units present contain the same organic units as the diorganosiloxane units. The polydiorganosiloxane molecules are preferably endblocked with triorganosiloxane units or hydroxyl groups, however, because the number of endgroups on these high molecular weight molecules represent an insignificant amount of the total gum composition, other endblocking groups can be present without departing from the scope of this invention because their effect would be insignificant.

The polydiorganosiloxane gums for this invention have from 1.5 to 17 mol percent diorganosiloxane units which contain vinyl or allyl, preferable vinyl. Polydiorganosiloxane gums which contain vinyl and allyl contents outside the above stated limits provide inferior products, such as they are poor blends and tend to separate, even after processing. No more than 50 percent of the total number of organic groups should be phenyl.

In the method of this invention the polyolefin can be present in amounts of from 25 to 93 weight percent and the polydiorganosiloxane gum in amounts of from 7 to 75 weight percent. The total weight of the polydiorganosiloxane gum and polyolefin equals 100 weight percent. Preferably, the amount of polydiorganosiloxane mixed with low density polyethylene is from 10 to 75 weight percent, with high density polyethylene from 7 to 50 weight percent, with polymethylpentene from 10 to 25 weight percent, with polypropylene from 10 to 60 weight percent and with the copolymers of tetrafluoroethylene and ethylene from 10 to 20 weight percent.

A stable blend of the above defined polyolefins and polydiorganosiloxane gums can be made by mechanically mixing them under certain specified conditions.

By a stable blend it is meant that the blend is homogeneous, does not separate at ambient conditions into respective layers or one material does not exude from the other, and that the blend can be used over a reasonable temperature range without exudation or separation.

The conditions at which these stable blends can be made are such that the mechanical mixing has a shear rate greater than 10 sec$^{-1}$. The shear rate is not critical, except that there be a shearing action taking place during the mixing of the polyolefin and the polydiorganosiloxane gum. The temperature at which mixing is done is critical and the range of temperatures suitable to produce the stable blends are different for each polyolefin. The low density polyethylene is mixed under mechanical shear with the polydiorganosiloxane gum at a temperature within the range from 175° to 300°C., preferably from 180° to 220°C. The high density polyethylene is mechanically mixed under shear with the polydiorganosiloxane gum at a temperature within the range from 200° to 320°C., preferably from 210° to 240°C. The specific temperature ranges for the other polyolefins are 225° to 300°C. for polymethylpentene, preferably 225° to 260°C., 215° to 300°C. for polypropylene, preferably 225° to 250°C., and 275° to 350° C. for the copolymers of tetrafluoroethylene and ethylene preferably 290° to 325°C. Mechanically mixing the defined polyolefins and the polydiorganosiloxane gums at a temperature below the critical range does not provide stable blends and no apparent grafting takes place. Mechanically mixing at a temperature above the critical range causes significant degradation of the polyolefin which is observed by discoloration and drastic deterioration of physical properties. The best properties for the blends are obtained within the preferred temperature ranges.

The mechanical mixing of the polyolefin and polydiorganosiloxane gum is continued under shear and at a suitable temperature for the particular combination for a period of time necessary to reach a viscosity within 60 percent of the maximum viscosity obtainable at the mixing conditions. In each case the viscosity during mixing increases above the original viscosity and passes through a maximum viscosity. This maximum viscosity is the preferred point to stop the mixing, however, the blends wherein the mixing is stopped at a viscosity which is within 60 percent of this maximum are suitable, stable and useful blends. The time period necessary to reach the maximum viscosity or within 60 percent of this maximum varies with each type of mixing equipment, each size of mixer, each mixer geometry, the temperature within the specified range and with each polyolefin. For many combinations and mixing equipment, the time to reach a viscosity within 60 percent of the maximum viscosity is frequently from 15 to 60 minutes. However, a worker should make at least one run with his specific equipment and combination of polyolefin and polydiorganosiloxane gum and observe the viscosity change during the processing to find the optimum length of time to come within 60 percent of the maximum viscosity. Any suitable viscosity determination and measuring technique can be used. Because some viscosity measuring techniques are more suitable for one mixer than another, the best viscosity measuring technique should be used for the particular equipment design. The only requirement is that the viscosity be measured at mixing conditions, that is, under shear and at temperature.

The particular types of mixers suitable for this invention are not critical insofar as they provide shearing action. Thus, a mill, a Banbury mixer, a Brabender Plasti-Corder and the like can be used.

It has been found that the best results for those blends containing more than 55 weight percent polydiorganosiloxane gum, are obtained if some oxygen is present in the atmosphere in the mixing equipment. For example, the atmosphere in the mixing equipment can be nitrogen or some other inert gas, however, above 55 weight percent gum, the presence of some oxygen is desirable. This oxygen can be from air or other oxygen sources. The atmosphere can be all air or its equivalent for any ratio of polyolefin to polydiorganosiloxane gum.

When a copolymer of tetrafluoroethylene and ethylene are used herein as the polyolefin, a stabilizing amount of magnesium oxide or similar conventional acid acceptor should be used. The magnesium oxide is conventionally used in processing tetrafluoroethylene containing polymers at high temperatures to neutralize any HF which might be given off because of the extremely corrosive nature of HF.

The blends of this method are stable, homogeneous blends which are readily processable by conventional fabricating techniques. These blends have good electrical properties with a modulus lower than the corresponding polyolefin. Thus, they are suitable insulation for electrical power cable. Additionally, they retain greater flexibility at low temperature and are suitable for applications where the articles (cable for example) would be in contact with soil. The blends have improved mar resistance and release properties compared to the polyolefin. These blends can be used in applications wherein gas permeability is required and variation of gas permeability is desired such as in medical applications. The gas permeability can be varied by composition variation. When the blends of this invention burn, no dripping of molten material occurs whereas when polyethylene burns, for example, molten materials drip from the burning material.

The blends are usually translucent, but have poor light transmittance. The light transmittance can be improved by using phenyl in the polydiorganosiloxane to match the refractive index of the polyolefin. For example, if the amount of methylphenylsiloxane units is greater than 50 mol percent in the polydiorganosiloxane gum of a blend made with low density polyethylene the light transmittance improves considerably.

The blends of this invention can be crosslinked by conventional means such as with organic peroxides, ultraviolet radiation, gamma radiation or sulfur. The crosslinked blends tend to lose a smaller percentage of their tensile strength at elevated temperatures than crosslinked polyethylene.

The blends of this invention contain graft copolymers which are formed during the mechanical mixing. This formation of the graft copolymer between the polyolefin and the polydiorganosiloxane appears to provide the blend stability and homogeniety.

Preferred blends are those which contain 25 to 93 weight percent polyethylene and 7 to 75 weight percent polydiorganosiloxane gum. At least some of the polydiorganosiloxane gum and polyethylene are bonded to each other forming a graft copolymer. These blends contain at least 50 weight percent of material which is insoluble in refluxing xylene. Even though these blends contain a high percentage of insoluble material, they are readily processable and can be fabricated into articles by extrusion, by molding and films can be produced.

The following examples are presented for illustrative purposes and should not be construed as limiting the present invention which is delineated in the claims.

EXAMPLE 1

A blend was prepared by mixing 30 grams of a low density polyethylene having a density of 0.92 grams per cubic centimeter and containing 6.5 weight percent copolymerized vinylacetate as determined by infrared analysis and which is sold by the Dow Chemical Company under the name Dow Polyethylene Resin 130 and 30 grams of a toluene soluble polydiorganosiloxane gum having hydroxyl endgroups, a Williams plasticity of about 0.065, and containing 96 mol percent dimethylsiloxane units and 4 mol percent methylvinylsiloxane units. The blend was prepared by mixing 20 minutes at 180°C. in a Brabender Plasti-Corder* using a type CAM head at 62 rpm. Another blend was prepared as described above but after the mixing the blend was cooled to 110°C. and 0.6 grams of 2,5-dimethyl-2,5-di(t-butylperoxy)hexane was added and the mixing was continued for two minutes. Test sheets were prepared by press molding one eighth inch thick sheets for 10 minutes at 177°C. to crosslink the blend. The above process was repeated two more times but without any polydiorganosiloxane gum and one polyethylene so processed was crosslinked as in the case of the above blend. The properties of the above materials were determined on the test pieces and were as shown in Table I. Young's Modulus was determined by the procedure of ASTM-D-797 with the values given in pounds per square inch (p.s.i.). Williams plasticity was determined on a 4.2 gram sample, for three minutes at room temperature in accordance with ASTM-D-926-67 procedure. The density was determined in accordance with ASTM-D-792 procedure. The ultimate tensile strength and elongation were determined in accordance with ASTM-D-638 procedure. The volume resistivity was determined in accordance with ASTM-D-257 procedure. The dielectric constant and the dissipation factor were determined in accordance with ASTM-D-150 procedure.

(* Trade-mark of C.W. Brabender Instruments, Inc., South Hackensack, N.J.)

Table I

| Property | Uncrosslinked Blend | Crosslinked Blend | Uncrosslinked Low Density Polyethylene | Crosslinked Low Density Polyethylene |
| --- | --- | --- | --- | --- |
| Young's Modulus, p.s.i. | 4,510 | 4,057 | 12,300 | 14,000 |
| Ultimate Tensile Strength, p.s.i. | 1,315 | 1,450 | 2,240 | 2,900 |
| Ultimate Elongation, % | 550 | 360 | 762 | 910 |
| Tensile Strength at 150°C., p.s.i. | — | 223 | — | 83 |

Table I

| Property | Uncrosslinked Blend | Crosslinked Blend | Uncrosslinked Low Density Polyethylene | Crosslinked Low Density Polyethylene |
|---|---|---|---|---|
| Volume Resistivity, ohm-cm | $4.21 \times 10^{15}$ | $1.73 \times 10^{15}$ | — | $1.67 \times 10^{16}$ |
| Dielectric Constant, $10^2$ cycles/sec. | 2.57 | 2.62 | — | 2.31 |
| Dielectric Constant, $10^5$ cycles/sec. | 2.56 | 2.83 | — | 2.28 |
| Dissipation Factor, $10^2$ cycles/sec. | 0.0019 | 0.0017 | — | 0.00059 |
| Dissipation Factor, $10^5$ cycles/sec. | 0.00139 | 0.00209 | — | 0.00184 |

EXAMPLE 2

Two blends were prepared as described in Example 1, except the mixing temperature was 185°C. instead of 180°C., the polydiorganosiloxane gum contained 98 mol percent dimethylsiloxane units and 2 mol percent methylvinylsiloxane units, and the amounts of polydiorganosiloxane gum used were as shown in Table II where the properties were as shown. The properties were determined on the uncrosslinked blends.

Table II

| Weight % Gum in Blend | Ultimate Tensile Strength, p.s.i. | Ultimate Elongation, % | Young's Modulus p.s.i. |
|---|---|---|---|
| 10 | 2,470 | 650 | 9,411 |
| 25 | 1,976 | 460 | 7,267 |

EXAMPLE 3

Blends were prepared as described in Example 1, except that the mixing conditions were varied as shown in Table III. The weight percentage of insoluble material was determined by extracting the resulting blends for 64 hours in refluxing xylene. The amounts of polydiorganosiloxane in both the soluble fractions and the insoluble fractions were determined by silicon analysis. The CAM head was used on the Brabender Plasti-Corder except for Run No. 8 and Run No. 9 where a roller head was used. This example shows that mixer geometry can be changed, the mixing speed can be changed and the temperature can be varied within limits. The properties shown in Table III were determined on uncrosslinked blends.

Table III

| Run No. | Mixing Temperature °C. | Mixing Speed, r.p.m. | Ultimate Tensile Strength p.s.i. | Weight % Insoluble Material | Weight % Polydiorganosiloxane in Insoluble Fraction | Weight % Polydiorganosiloxane in Soluble Fraction |
|---|---|---|---|---|---|---|
| 1** | 150 | 62 | 119 | 21 | 10 | 55 |
| 2** | 170 | 62 | 115 | — | — | — |
| 3 | 185 | 15 | 1381 | 59 | 71 | 12 |
| 4 | 185 | 62 | 1235 | 77 | 68 | 13 |
| 5 | 185 | 192 | 1477 | 70 | 61 | 7 |
| 6 | 200 | 62 | 1280 | 58 | 61 | 6 |
| 7 | 222 | 62 | 1431 | 82 | 43 | 14 |
| 8 | 185 | 62 | 1097 | 55 | 68 | 15 |
| 9 | 220 | 62 | 658 | 73 | 51 | 34 |

Blends as described in Example 1 were prepared using a Banbury mixer at the conditions shown in Table IV. The temperature in the mixer was controlled by a combination of steam heating, cooling water and mixing speed. Initially, the materials were heated with steam and fast mixing speed. Then cooling water and lower mixing speeds were used to keep the temperature constant. Run No. 8 shows the results wherein the blend from the Banbury mixer was post mixed in a Brabender Plasti-Corder. Run Nos. 9, 10 and 11 show the results wherein the blend was made in a Brabender Plasti-Corder. The results shown in Table IV were determined on uncrosslinked compression molded samples.

Table IV

| Run No. | Mixing Temperature, °C. | Mixing Time, min. | Ultimate Tensile Strength p.s.i. | Ultimate Elongation, % | Young's Modulus p.s.i. |
|---|---|---|---|---|---|
| 1 | 180 | 5 | 428 | 82 | 3270 |
| 2 | 180 | 10 | 657 | 287 | 3089 |
| 3 | 204 | 10 | 770 | 300 | 5000 |
| 4 | 180 | 15 | 660 | 250 | 4160 |
| 5 | 193 | 15 | 850 | 330 | 4300 |
| 6 | 204 | 20 | 1020 | 340 | 3800 |
| 7 | 180 | 30 | 740 | 230 | 4100 |
| 8 | 204 | 20 | 1128 | 300 | 3800 |
| 9 | 185 | 10 | 892 | 295 | 3685 |
| 10 | 185 | 20 | 1315 | 550 | 4510 |
| 11 | 185 | 30 | 1235 | 535 | 4030 |

EXAMPLE 5

Blends, as described and prepared in Example 1, except the mixing temperature was 185°C. instead of 180°C. and the weight ratios of low density polyethylene to polydiorganosiloxane gum were as shown in Table V, were compression molded into films having a thickness of 0.005 inch. The gas permeabilities were then determined for oxygen, nitrogen and carbon dioxide gases in accordance with ASTM-D-1434-166 (Reapproved 1972) procedure. The gas permeabilities were as shown in Table V. The gas permeabilities for molded low density polyethylene, low density polyethylene mixed in a Brabender Plasti-Corder in accordance with the procedure in Example 1, and a standard commercial silicone rubber were determined and are presented in Table V for comparison.

To further illustrate the variation of time to reach the maximum viscosity, it was observed for a blend of 50 weight percent of the low density polyethylene and 50 weight percent of the polydiorganosiloxane gum that the maximum torque in a Brabender Plasti-Corder was minutes at 200°C. and in about 7 minutes at 220°C. The reached in about 17 minutes at 180°C., in about 11 mixer speed was 62 r.p.m. in each case and a CAM head was used.

Table V

| Material | Gas Permeabilities, (cc)(mil)/(100 in$^2$)(atm)(24 hr) | | |
|---|---|---|---|
| | Oxygen | Nitrogen | Carbon Dioxide |
| Molded Polyethylene | 419 | 138 | 210 |
| Polyethylene mixed in Brabender | 483 | 148 | 221 |
| Blend of 75 weight percent polyethylene and 25 weight percent polydiorganosiloxane gum | 811 | 335 | 4,540 |
| Blend of 50 weight percent polyethylene and 50 weight percent polydiorganosiloxane gum | 1,880 | 506 | 7,600 |
| Blend of 25 weight percent polyethylene and 75 weight percent polydiorganosiloxane gum | 9,400 | 3,070 | 29,000 |
| Silicone Rubber | 122,000 | 55,000 | 467,000 |

EXAMPLE 6

Blends were prepared in a Brabender Plasti-Corder with a CAM head, at 62 r.p.m., at 185°C. and mixing for 20 minutes. The amounts of low density polyethylene as described in Example 1 and polydiorganosiloxane gum as described in Example 1 were varied. Table VI shows the physical properties which were obtained. Table VI also shows the maximum torque observed during the mixing for a number of the compositions. The torque in meter-grams is a means for measuring the viscosity at mixing conditions and was read from a dial.

EXAMPLE 7

Blends were prepared as described in Example 6, except the mol percentages of the methylvinylsiloxane units and dimethylsiloxane units were varied. The blends were prepared using 50 weight percent low density polyethylene and 50 weight percent polydiorganosiloxane gum. The physical properties obtained were as shown in Table VII.

Table VII

| Composition of Polydiorganosiloxane Gum | | Ultimate Tensile Strength, | Ultimate Elongation, | Young's Modulus |
|---|---|---|---|---|
| Mol % (CH$_3$)$_2$SiO | Mol % (CH$_3$)(CH$_2$=CH)SiO | p.s.i. | % | p.s.i. |
| 99.86 | 0.14*** | 26 | 7.5 | 522 |
| 98 | 2.0 | 185 | 25 | 1,714 |
| 97.5 | 2.5 | 842 | 360 | 3,544 |
| 96 | 4.0 | 1315 | 550 | 4,510 |
| 85 | 15 | 940 | 310 | 3,250 |

***Presented for comparative purposes.

EXAMPLE 8

Blends of a high density polyethylene and the polydiorganosiloxane gum defined in Example 1 were pre-

Table VI

| Weight % Polydiorganosiloxane gum | Weight % low density polyethylene | Maximum Torque, m-gm. | Ultimate Tensile Strength, p.s.i. | Ultimate Elongation % | Young's Modulus p.s.i. |
|---|---|---|---|---|---|
| 0 | 100 | 1995 | 2,830 | 900 | 13,800 |
| 10 | 90 | — | 2,490 | 715 | 11,600 |
| 15 | 85 | 1060 | — | — | — |
| 25 | 75 | 460 | 1,710 | 560 | 8,740 |
| 40 | 60 | — | 1,523 | 665 | 6,339 |
| 45 | 55 | — | 1,305 | 522 | 5,042 |
| 50 | 50 | 350 | 1,315 | 550 | 4,510 |
| 55 | 45 | — | 1,225 | 560 | 4,242 |
| 60 | 40 | — | 1,229 | 650 | 3,489 |
| 75 | 25 | 300 | 512 | 175 | 1,100 | pared in a Brabender Plasti-Corder using a CAM head at 25 r.p.m. and a mixing temperature of 200°C. The high density polyethylene had a density of 0.96 and was purchased by the name Phillips Marlex EHB 6002 high density polyethylene. The amounts of polyethylene and gum used in each blend, the length of time mixed, the torque observed at various times during mixing and the physical properties were as shown in Table VIII.

67,893 p.s.i. The blend obtained had a tensile strength at yield of 1,060 p.s.i. and a tensile strength at break of 1,114 p.s.i., an elongation of 88 percent, and a Young's Modulus of 14,904 p.s.i. The above procedure provided equivalent blends when the polydiorganosiloxane gum was replaced by either a gum having 4 mol percent methylvinylsiloxane units or 10 mol percent methylvinylsiloxane units.

Table VIII

| Weight % High density polyethylene | Weight % Polydiorgano-siloxane gum | Mixing Time, min. | Torque, m-gm. | Ultimate Tensile Strength p.s.i. | Ultimate Elongation % | Young's Modulus p.s.i. |
| --- | --- | --- | --- | --- | --- | --- |
| 100 | 0 | 15 | — | 3,649 | 55 | 69,039 |
| 100 | 0 | 60 | — | 2,967 | 1125 | 63,873 |
| 93 | 7 | 19 | — | 2,744 | 1168 | 65,475 |
| 90 | 10 | 30 | — | 2,818 | 1300 | 62,545 |
| 90 | 10 | 60 | — | 3,240 | 525 | 57,540 |
| 85 | 15 | 30 | — | 2,300 | 1200 | 62,000 |
| 85 | 15 | 60 | — | 2,782 | 275 | 56,861 |
| 50 | 50 | 10 | 400 | 280 | 13 | 4,429 |
| 50 | 50 | 14 | 800 | 1,240 | 318 | 25,695 |
| 50 | 50 | 25 | 1200 | 1,807 | 637 | 24,132 |
| 50 | 50 | 29 | 1520 | 2,140 | 633 | 25,156 |
| 50 | 50 | 35 | 1720 | 2,201 | 581 | 23,980 |
| 50 | 50 | 45 | 1520 | 1,947 | 328 | 23,638 |
| 50 | 50 | 67 | 1320 | 1,711 | 286 | 21,083 |
| 50 | 50 | 120 | 840 | 1,642 | 262 | 25,029 |

EXAMPLE 9

Blends of polymethylpentene purchased under the name TPX-RT- 20 Methylpentene Polymer from ICI America Inc. and polydiorganosiloxane gums as defined in Table IX were prepared in a Brabender Plasti-Corder using a CAM head, at 50 r.p.m. and a mixing temperature of 240°C. The amounts of polymethylpentene and polydiorganosiloxane gum used were as defined in Table IX. The physical properties were as shown in Table IX.

EXAMPLE 10

A blend of 50 weight percent polypropylene purchased as Pro Fax 6523 polypropylene made by Hercules Powder Co., Wilmington, Dela. and 50 weight percent of a polydiorganosiloxane gum having a Williams plasticity of about 0.065 inch and having 98 mol percent dimethylsiloxane units and 2 mol percent methylvinylsiloxane units with hydroxyl endblocking was prepared by mixing in a Brabender Plasti-Corder with a CAM head, at 30 r.p.m. for 20 minutes at 240°C. Polypropylene had a tensile strength at break of 4,812 p.s.i., an elongation of 17 percent and a Young's Modulus of

EXAMPLE 11

In a Brabender Plasti-Corder having a CAM head, a blend of 50 grams of a copolymer of tetrafluoroethylene repeating units and ethylene repeating units purchased as Tefzel 200 from E. I. Dupont De Nemours & Co., Wilmington, Dela., 5 grams of magnesium oxide, and 5 grams of a polydiorganosiloxane gum as defined in Example 1 was prepared by mixing at 40 r.p.m. for 30 minutes at 305°C. A homogeneous, strong, stable blend was obtained which could readily be compression molded.

Table IX

| Weight % Polymethyl-pentene | Weight % Polydiorgano-siloxane gum | Mol Percent of siloxane units in Polydiorganosiloxane gum $(CH_3)_2SiO$ | $(CH_3)(CH_2=CH)SiO$ | Tensile Strength at yield, p.s.i. | Tensile Strength at break, p.s.i. | Ultimate Elongation % | Young's Modulus, p.s.i. |
| --- | --- | --- | --- | --- | --- | --- | --- |
| 100 | 0 | — | — | 4227 | 2331 | 71 | 97,285 |
| 90 | 10 | 96 | 4 | 2550 | 2000 | 65 | 50,000 |
| 90 | 10 | 90 | 10 | — | 2662 | 21 | 50,603 |
| 80 | 20 | 90 | 10 | — | 1685 | 13 | 51,881 |
| 80 | 20 | 80 | 20 | 1841 | 1560 | 26 | 54,945 |
| 75 | 25 | 98 | 2 | — | 1800 | 44 | 41,000 |

EXAMPLE 12

The advantages of having oxygen present at high polydiorganosiloxane gum concentrations was demonstrated by preparing blends of the high density polyethylene and the polydiorganosiloxane defined in Example 1 in a Brabender Plasti-Corder with a CAM head at 40 r.p.m. for 40, 45, 46, and 48 minutes respectively for each run as listed in Table X at 220°C. where both nitrogen and air atmospheres were used. The amounts of polyethylene and polydiorganosiloxane gum and the physical properties obtained were as shown in Table X.

Table X

| Weight % high density polyethylene | Weight % polydiorgano-siloxane gum | Nitrogen Atmosphere | | | Air Atmosphere | | |
| --- | --- | --- | --- | --- | --- | --- | --- |
| | | Ultimate Tensile Strength p.s.i. | Ultimate Elongation, % | Young's Modulus, p.s.i. | Ultimate Tensile Strength p.s.i. | Ultimate Elongation % | Young's Modulus, p.s.i. |
| 75 | 25 | 2,715 | 600 | 37,313 | 2,562 | 425 | 31,404 |
| 50 | 50 | 1,948 | 414 | 29,092 | 1,699 | 408 | 26,003 |

Table X

| Weight % high density polyethylene | Weight % polydiorgano-siloxane gum | Nitrogen Atmosphere | | | Air Atmosphere | | |
|---|---|---|---|---|---|---|---|
| | | Ultimate Tensile Strength p.s.i. | Ultimate Elongation, % | Young's Modulus, p.s.i. | Ultimate Tensile Strength p.s.i. | Ultimate Elongation % | Young's Modulus, p.s.i. |
| 40 | 60 | 728 | 17 | 13,820 | 1,378 | 236 | 14,310 |
| 25 | 75 | 412 | 69 | 3,348 | 1,050 | 415 | 4,088 |

EXAMPLE 13

Blends of 50 weight percent low density polyethylene and 50 weight percent of a polydiorganosiloxane gum having the composition as defined in Table XI were prepared as described in Example 1. The light transmittance was determined with the results appearing in Table XI. The blend of Run No. 7 had a tensile strength at break of 1,036 p.s.i., an elongation of 500 percent and a Young's modulus of 3,214 p.s.i. Slabs of the blends, Run Nos. 5, 6 and 7, having a thickness of one eighth inch were sufficiently clear to read ordinary type through the slabs.

Table XI

| Run No. | Polydiorganosiloxane gum Composition, Mol % | | | Light Transmittance % |
|---|---|---|---|---|
| | $(CH_3)_2SiO$ | $(CH_3)(CH_2{=}CH)SiO$ | $(CH_3)(C_6H_5)SiO$ | |
| 1 | 96 | 4 | 0 | 0.3 |
| 2 | 58 | 8 | 34 | 0.5 |
| 3 | 47.6 | 6.4 | 46 | 2.9 |
| 4 | 38 | 12 | 50 | 8.5 |
| 5 | 36.1 | 7.9 | 56 | 36.0 |
| 6 | 32 | 9 | 59 | 30.5 |
| 7 | 33 | 5 | 62 | 36.2 |
| 8 | **** | — | — | 4.4 |

****100% low density polyethylene

That which is claimed is:

1. A method of blending a polyolefin and a polydiorganosiloxane gum comprising mechanically mixing a polydiorganosiloxane gum and a polyolefin selected from the group consisting of low density polyethylene, high density polyethylene, polymethylpentene, polypropylene and a copolymer consisting of tetrafluoroethylene repeating units and ethylene repeating units, at a shear rate greater than 10 sec$^{-1}$ for a period of time suitable to obtain a viscosity within 60 percent of the maximum viscosity obtainable at mixing conditions, and at a temperature within a range for each polyolefin of from 175° to 300°C. for low density polyethylene, from 200° to 320°C. for high density polyethylene, from 225° to 300°C. for polymethylpentene, from 215° to 300°C. for polypropylene and from 275° to 350°C. for copolymers of tetrafluoroethylene repeating units and ethylene repeating units and thereafter recovering a processable stable, homogeneous blend, said polydiorganosiloxane gum being present in an amount of from 7 to 75 weight percent and said polyolefin being present in an amount of from 25 to 93 weight percent wherein the combined weight of the polydiorganosiloxane gum and polyolefin is 100 weight percent, said polydiorganosiloxane gum being a toluene soluble gum having a Williams plasticity greater than 0.020 inch, with a ratio of organic groups per silicon atom of about two wherein the organic groups are selected from methyl, phenyl, vinyl and allyl with from 1.5 to 17 mol percent of the siloxane units having vinyl or allyl groups and no more than 50 percent of the organic groups being phenyl.

2. The processable, stable, homogeneous blend prepared by the method of claim 1.

3. The method in accordance with claim 1 in which the polyolefin is low density polyethylene, the temperature is from 175° to 300°C. and the amount of polydiorganosiloxane gum is from 10 to 75 weight percent.

4. The method in accordance with claim 1 in which the polyolefin is high density polyethylene, the temperature is from 200° to 320°C. and the amount of polydiorganosiloxane gum is from 7 to 50 weight percent.

5. The method in accordance with claim 1 in which the polyolefin is polymethylpentene, the temperature is from 225° to 300°C. and the amount of polydiorganosiloxane gum is from 10 to 25 weight percent.

6. The method in accordance with claim 1 in which the polyolefin is polypropylene, the temperature is from 215° to 300°C. and the amount of polydiorganosiloxane is from 10 to 60 weight percent.

7. The method in accordance with claim 1 in which the polyolefin is a copolymer of tetrafluoroethylene repeating units and ethylene repeating units, the temperature is from 275° to 350°C. and the amount of polydiorganosiloxane is from 10 to 20 weight percent.

8. The method in accordance with claim 1 in which the polydiorganosiloxane is present in an amount of 55 to 75 weight percent and said mechanical mixing being done in the presence of at least a small amount of oxygen.

9. A processable blend prepared by the method of claim 1 consisting essentially of 25 to 93 weight percent polyethylene and 7 to 75 weight percent polydiorganosiloxane gum where the combined weight of the polyethylene and the polydiorganosiloxane gum is 100 weight percent, wherein at least some of the polydiorganosiloxane gum and the polyethylene are bonded to each other forming a graft copolymer, there being present at least 50 weight percent of the total blend of material which is insoluble in refluxing xylene, said polydiorganosiloxane gum before becoming a component of said blend being soluble in toluene, having a Williams plasticity greater than 0.020 inch, having a ratio of organic groups per silicon atom of about two, wherein the organic groups are selected from methyl, phenyl, vinyl and allyl with from 1.5 to 17 mol percent of the siloxane units having vinyl or allyl groups and no more than 50 percent of the organic groups being phenyl.

* * * * *